(12) United States Patent
Jitaru et al.

(10) Patent No.: US 7,719,137 B2
(45) Date of Patent: May 18, 2010

(54) DC-DC SWITCHING CONVERTER DEVICE

(75) Inventors: Ionel D. Jitaru, Tucson, AZ (US);
Bogdan T. Bucheru, Bucharest (RO);
Lucian Hriscu, Bucharest (RO); Marco A. Davila, Jr., Tucson, AZ (US)

(73) Assignee: DET International Holding Limited, Grand Cayman (KY)

( * ) Notice: Subject to any disclaimer, the term of this patent is extended or adjusted under 35 U.S.C. 154(b) by 452 days.

(21) Appl. No.: 10/548,393

(22) PCT Filed: Mar. 10, 2004

(86) PCT No.: PCT/CH2004/000140

§ 371 (c)(1),
(2), (4) Date: Feb. 21, 2006

(87) PCT Pub. No.: WO2004/082112

PCT Pub. Date: Sep. 23, 2004

(65) Prior Publication Data

US 2006/0197384 A1    Sep. 7, 2006

(51) Int. Cl.
*H02J 3/14* (2006.01)
(52) U.S. Cl. ........................................................ 307/31
(58) Field of Classification Search .................... 307/31; 363/65, 16; 323/271, 272
See application file for complete search history.

(56) References Cited

U.S. PATENT DOCUMENTS 4,496,801 A * 1/1985 Roberts et al. ................ 379/30
5,045,712 A * 9/1991 Baggenstoss ................. 307/29
5,691,889 A * 11/1997 Bazinet et al. ................ 363/89
5,724,237 A * 3/1998 Hunter .......................... 363/65

(Continued)

OTHER PUBLICATIONS

"Preliminary Tech Spec, Narrow Input, Isolated DC/DC Bus Converter," SynQor Document No. 005-2BQ512J, Rev. 7, Aug. 2002.*

(Continued)

*Primary Examiner*—Fritz M Fleming
*Assistant Examiner*—Daniel Cavallari
(74) *Attorney, Agent, or Firm*—Venable LLP; Robert S. Babayi; Rae Fischer (57) ABSTRACT

A DC-DC switching converter device (101), in particular a quarter-brick or eighth-brick device having an industry standard pin out, comprises a pulse-width modulation circuit (132) for driving a power converting switch, a trim connector (109) for adjusting an output voltage of the device, where the device (101) is designed such that the pulse-width modulation circuit (132) is synchronizable to an external oscillator by an external synchronization signal applied to the trim connector. A DC-DC converting circuit comprises a plurality of DC-DC switching converters (101) featuring trim connectors (109) for adjusting output voltages of the converters (101), whereby the converters (101) are connected such that they share a common input bus. It further features a system EMI (electromagnetic interference) filter common to all the DC-DC switching converters (101) and an external oscillator delivering an external synchronization signal to the plurality of DC-DC switching converters (101). The external oscillator is designed such that a frequency of the external synchronization signal is higher than a free running frequency of each of the plurality of DC-DC switching converters (101). The external oscillator is connected to the trim connectors (109) of the DC-DC switching converters (101).

18 Claims, 8 Drawing Sheets

U.S. PATENT DOCUMENTS

| | | | | |
|---|---|---|---|---|
| 5,821,826 | A * | 10/1998 | Newlin | 331/74 |
| 6,201,723 | B1 * | 3/2001 | Farrington | 363/147 |
| 7,002,266 | B1 * | 2/2006 | Adkins et al. | 307/151 |
| 2003/0174037 | A1 * | 9/2003 | Hooey et al. | 336/61 |

OTHER PUBLICATIONS

VICOR Corporation Publication P/N. 10418 Rev. Jan. 1, 1995.*
VICOR Applications Manual, pp. 1-1,2-1,2-2,3-1,5-1,6-1,8-1,9-1,9-2 and 9-3.*

* cited by examiner

DC-DC SWITCHING CONVERTER DEVICE

TECHNICAL FIELD

The invention relates to a DC-DC switching converter device, in particular a quarter-brick or eighth-brick device having an industry standard pin out, comprising a pulse-width modulation (PWM) circuit for driving a power converting switch and a trim connector for adjusting an output voltage of the device. The invention further relates to a DC-DC converter circuit and a method of converting a first DC voltage into a second DC voltage.

BACKGROUND ART

DC-DC switching converters, i.e. devices that accept a DC input voltage and produce a DC output voltage, in particular on another voltage level, have a wide range of applications in today's power electronics. DC-DC Switching converters are used e.g. for power supplies, DC motor control or battery management. Apart from converting the input DC voltage they provide noise isolation, power bus isolation etc. The switching regulators allow for step-up operation or voltage inversion and offer a higher efficiency compared to linear regulators. Using a transformer as the energy-storage element also allows the output voltage to be electrically isolated from the input voltage.

However, the switching operation of the converter creates noise that has to be suppressed in order to avoid electromagnetic interference (EMI) affecting other devices connected to the power converter. To achieve this, an EMI filter, i.e. a suitable low-pass filter, is commonly arranged on the input side of the converter. The EMI filter rejects the fixed frequency current ripple generated by the switching converter.

In cases where more power has to be delivered into different loads or where different output voltages have to be provided it is known to parallel a plurality of DC-DC converters. The converters share the same input bus and use one common EMI filter. However, this arrangement leads to frequency beating phenomena between different converters sharing the same line input as well as to additional low frequency interferences. Altogether, the peak to peak amplitude of the interference may be about five times higher than those of just the input current ripple created by a single converter. This greatly increases the performance demand for the system EMI filter. In principle, most of the additional interference due to the parallel arrangement of the converters might be avoided by externally synchronizing the converter's switching frequencies.

However, synchronization is not easily possible with basic types of switching converters that are widely used for output voltages of several volts and output currents of about 10-60 A, namely the so-called "quarter-brick" or "eighth-brick" converters. These types have predefined mechanical dimensions and feature an industry-standard pin out, including two input and two output connectors, an On/Off connector for remotely controlling the device, two output sensing connectors for line drop compensation as well as a trim connector (called sometimes the "trim pin" or "trim terminal") for adjusting the output voltage of the device.

However, the industry standard quarter and eighth-brick formats do not allow for an extra pin available for external frequency synchronization. Therefore, a sophisticated EMI filter device has to be employed with prior art quarter or eighth-brick converters, or the DC-DC converting circuit has to be completely redesigned in order to utilize specific DC-DC converters that provide extra pins for synchronization. Both possibilities are costly and cumbersome.

SUMMARY OF THE INVENTION

It is therefore the object of the invention to create a DC-DC switching converter device pertaining to the technical field initially mentioned, that allows for the reduction of noise in the case of a plurality of DC-DC converters arranged in parallel and sharing a common input bus and EMI filter, the device being cost-efficient and easy to implement into usual converter circuits.

In one exemplary embodiment of the invention the solution of the invention is provided by a DC-DC switching converter having a pulse-width modulator circuit for driving a power converting switch, and a trim connector for adjusting an output voltage of the device, wherein the pulse-width modulation circuit is synchronizable to an external oscillator by an external synchronization signal applied to the trim connector.

The usual functionality of the trim connector is not lost, but the external synchronization signal is superimposed to the trim DC voltage (if present). With the inventive device, the trim connector serves two purposes, namely for adjusting the output voltage and additionally for externally synchronizing the pulse-width modulation circuit. Thereby, synchronization of a plurality of DC-DC converters having no extra sync pin becomes possible. This is particularly advantageous in the case of the widely used quarter or eighth-brick converters having the standard pin out because employing the inventive devices does not require an extensive redesign of the usual converter circuits, neither concerning the electrical circuit nor the mechanical arrangement. Due to the added possibility of external synchronization a rather simple EMI filter may cope with the residual interference generated by a plurality of the inventive devices arranged in a parallel fashion.

Preferably, the device comprises a low pass filter connected between the trim connector and a compensation loop of the device in order to avoid disturbances of the compensation loop by the external synchronization signal. The low pass filter rejects the high frequency external synchronization component of the combined signal but is passed by the trim component, which is a substantially constant DC voltage. The filter is chosen to have a cut off frequency well below the frequency of the external oscillator and an attenuation that effectively suppresses the high frequency component.

Advantageously, the device comprises a buffer and level shift circuit connected between the trim connector and the pulse-width modulation circuit for processing the external synchronization signal, in particular for processing a rectangular external synchronization signal on a 5 Vp-p amplitude TTL level. The buffer and level shift circuit processes the raw synchronization signal in such a way that it is directly useable in the pulse-width modulation circuit. Thereby, a simple external oscillator that is easily commercially available and of low cost may be used, in particular one that generates a common rectangular 5 Vp-p amplitude signal according to the TTL ("Transistor-Transistor Logic") industry standard. Such a signal is easy to transmit, in particular because it is not susceptible to noise, and easy to filter out from the combined trim/synchronization signal.

Alternatively, the processing of the synchronization signal happens outside of the device and the preprocessed signal is fed to the trim pin. Inside the device it is only filtered out from the combined trim/synchronization signal and delivered directly to the PWM circuit.

Preferably, the buffer and level shift circuit is designed and connected such that an oscillator unit of the pulse-width modulation circuit is controlled by an output signal of the buffer and level shift circuit delivered to an R/C (remote control) pin of the oscillator unit. The internal PWM will be locked up and change the converter's switching frequency from the free running frequency to the external synchronization signal frequency. This allows for using the commercially available oscillator units commonly used in DC-DC power converters, such as commercially available low power current mode push-pull PWM units.

Preferably, a coupling capacitor is connected between the trim pin and the buffer and level shift circuit. The capacitor filters out the DC (trim) component of the combined trim/synchronization signal and thereby prevents it from disturbing the buffer and level shift circuitry. The capacity is chosen such that the high frequency synchronization signal is efficiently separated from the low frequency trim component.

In a further exemplary preferred embodiment of the invention a DC-DC converting circuit comprises
a) a plurality of DC-DC switching converters featuring trim connectors for adjusting output voltages of the converters, whereby the converters are connected such that they share a same input bus;
b) a system EMI (electromagnetic interference) filter common to all the DC-DC switching converters;
c) an external oscillator delivering an external synchronization signal to the plurality of DC-DC switching converters;
d) where the external oscillator is designed such that a frequency of the external synchronization signal is higher than a free running frequency of each of the plurality of DC-DC switching converters; and
e) where the external oscillator is connected to the trim connectors of the DC-DC switching converters.

Thereby, the switching frequencies of all the converters connected to the external oscillator are synchronized by the external synchronization signal that is delivered in phase to the trim connectors. Thereby, the frequency beating phenomena between different converters are eliminated.

Advantageously, the external oscillator is designed such that the external synchronization signal is rectangular, and in particular on a 5 Vp-p amplitude TTL level. Such a signal is easy to transmit and easy to filter out from the combined signal delivered to the trim connector.

Preferentially, coupling capacitors are connected between the external oscillator and the trim connectors of the DC-DC switching converters. Thereby, impact of the (substantially DC) trim voltage or other low-frequency interference on the external oscillator is avoided.

Preferably, the DC-DC converting circuit comprises at least one fixed delay cell, connected between the external oscillator and one of the plurality of DC-DC switching converters for allowing phase interleaving between different DC-DC switching converters.

This allows for delaying the external synchronization signal applied to one or more of the plurality of DC-DC switching converters, such that phase interleaving between different DC-DC converters is achieved. Due to the interleaving, ripple effects of the different frequency synchronized converters will not be additive, such that the amplitude of the electromagnetic interference to be filtered out by the system EMI filter is further reduced.

A method of converting a first DC voltage to a second DC voltage in accordance with a preferred exemplary embodiment of the invention comprises the steps of a) providing a plurality of DC-DC switching converters featuring trim connectors for adjusting output voltages of the converters; and connecting the converters to a same input bus;
b) connecting a system EMI (electromagnetic interference) filter to the input bus;
c) providing an external synchronization signal having a frequency that is higher than a free running frequency of each of the plurality of DC-DC switching converters; and
d) applying the external synchronization signal to the trim connectors of the DC-DC switching converters.

Other advantageous embodiments and combinations of features will be apparent from the detailed description below and the totality of the claims as may be further objects and advantages.

BRIEF DESCRIPTION OF THE DRAWINGS

The drawings used to explain the embodiments are.

In the figures, the same components are given the same reference numerals.

PREFERRED EMBODIMENTS

Figure 1A:
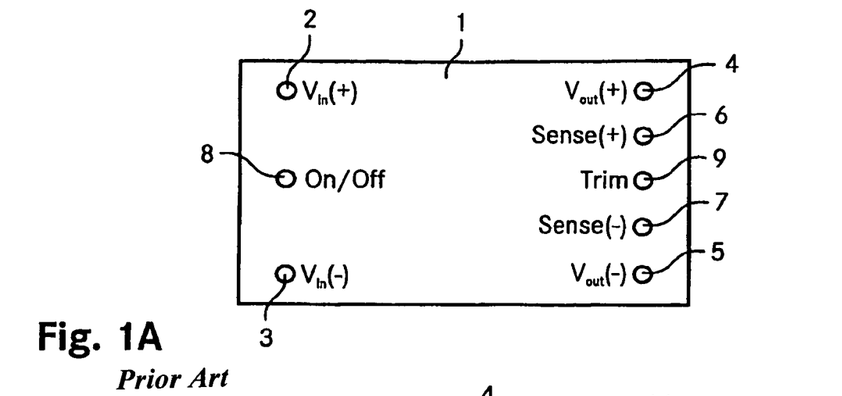
FIG. 1A-C Schematic representations of an industry standard quarter-brick DC-DC converter and of its trim functionality.
Figure 1B:
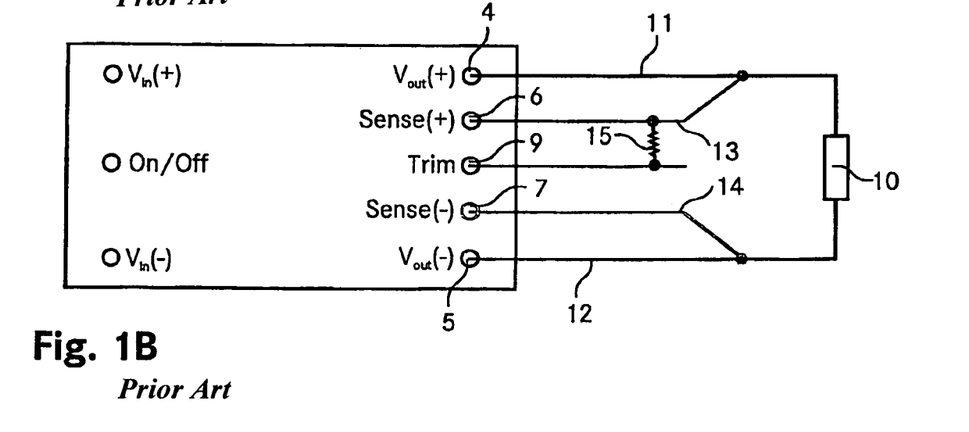
Figure 1C:
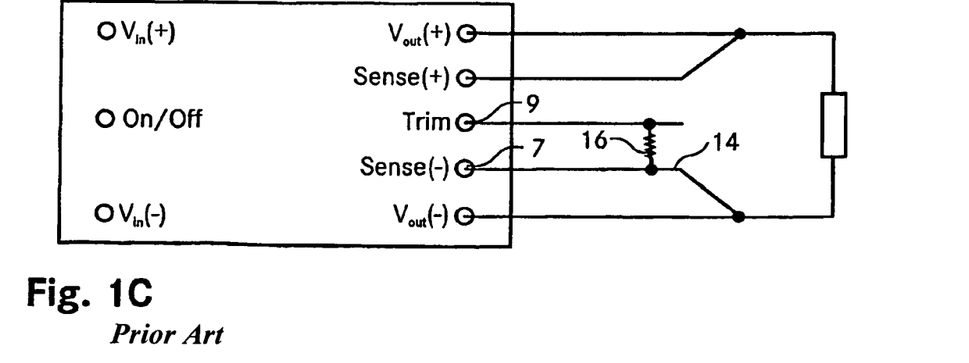

The FIGS. 1A-C are schematic representations of an industry standard quarter-brick DC-DC converter and of its trim functionality. The FIG. 1A shows the pin out of a standard quarter-brick DC-DC converter 1. It features eight pins, namely two input pins 2, 3 indicated by $V_{in}(+)$ and $V_{in}(-)$ respectively, two output pins 4, 5 $V_{out}(+)$ and $V_{out}(-)$, two sense pins 6, 7, denoted by Sense(+) and Sense(−), a control pin 8 (On/Off) and finally a trim pin 9 (Trim). The dimensions of a quarter-brick device are 37 mm×58 mm (1.45"×2.3"), its height usually amounts to about 13 mm or less. The pins are on a spacing of 51 mm (2"). The sense pins 6, 7 allow for sensing the line drop and accordingly compensating the output voltage.

Note, that the invention is as well applicable to eighth-brick DC-DC converters, having the same pin out as described above. Their standard size is 23 mm×58 mm (0.90"×2.3") with a typical width of about 9 mm. Again, the pins are on a spacing of 51 mm (2").

The trim functionality is schematically represented in FIGS. 1B, 1C. A load 10 is connected to the output pins 4, 5 by output lines 11, 12, and the sense lines 13, 14 are connected to the respective output lines 11, 12 close to the load 10. FIG. 1B shows the "trim up" configuration where the output voltage is increased by connecting a trim up resistor 15 between the trim pin 9 and the sense line 13 connected to the Sense(+) pin 6. Internally, the trim voltage applied to the trim pin 9 is suitably combined with a reference voltage and fed to an error amplifier where the combined voltage is compared to the actual output voltage. Depending on the output of the error amplifier the duty cycle of the power switch is adjusted in order to equal the actual output voltage to the desired voltage set by the trim and reference voltages.

Similarly, FIG. 1C shows the "trim down" configuration, where the output voltage is decreased by connecting a trim down resistor 16 between the trim pin 9 and the sense line 14 connected to the Sense(−) pin 7. Generally, the voltage applied to the trim pin 9 is substantially DC referred to the $V_{out}(-)$ output pin 5. Voltage trim ranges of typical quarter-brick DC-DC converters amount to about ±10-20%.

Figure 2:
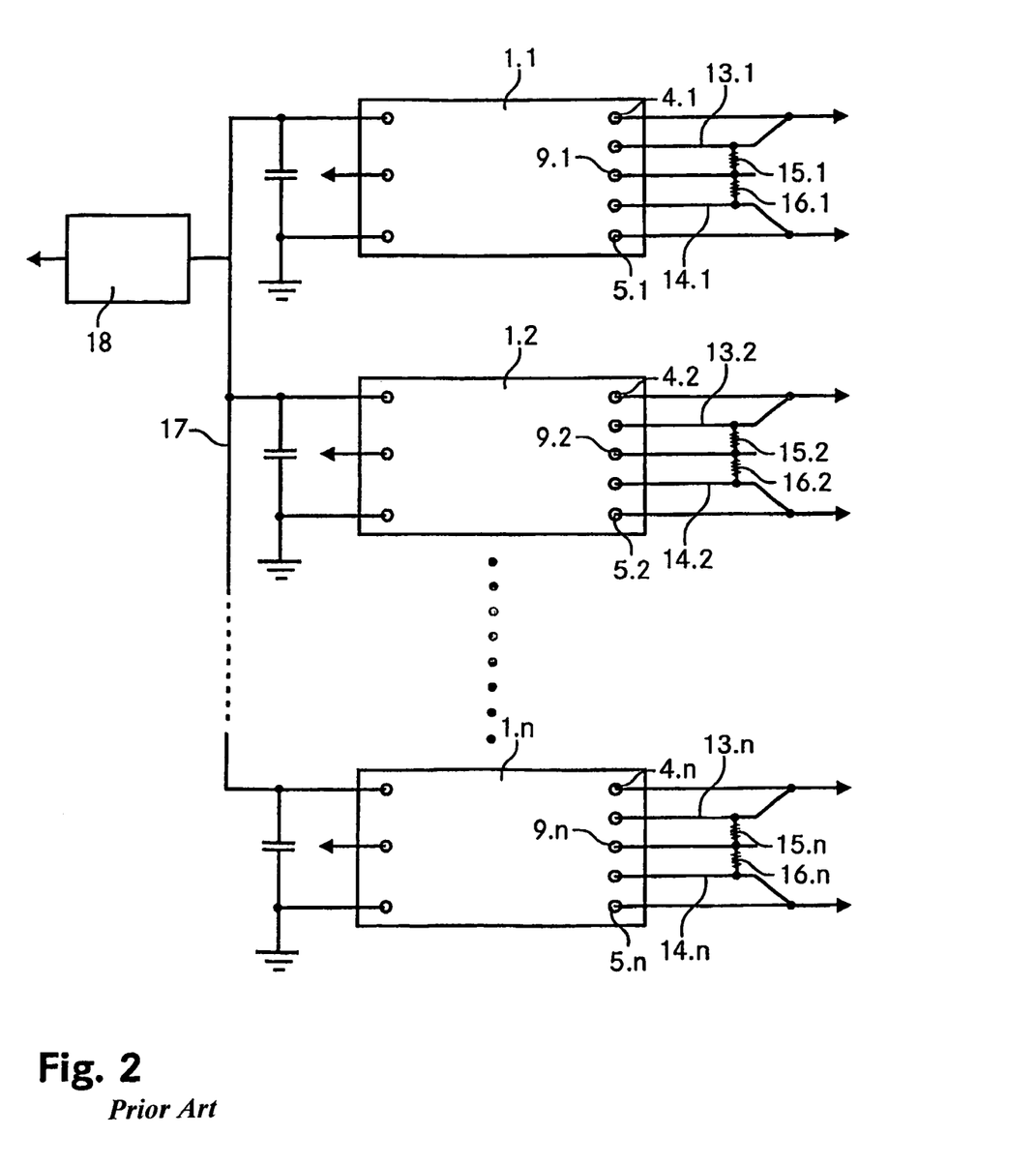
FIG. 2 a schematic representation of a plurality of prior art DC-DC converters arranged in parallel, sharing a common input bus and system EMI filter.

The FIG. 2 is a schematic representation of a plurality of prior art DC-DC converters arranged in parallel, sharing a common input bus and system EMI filter. The converters 1.1, 1.2, . . . , 1.$n$ are connected to the input bus 17 which in turn is connected to a power source via a system EMI (electromagnetic interference) filter 18. The EMI filter 18 is common to all the converters 1.1, 1.2, . . . , 1.$n$ and its purpose is to reject the interference they generate. Various loads are connected to the converters 1.1, 1.2, . . . , 1.$n$ between the respective output pins 4.1, 5.1; 4.2, 5.2; . . . ; 4.$n$, 5.$n$. Each of the converters 1.1, 1.2, . . . , 1.$n$ may be individually trimmed by arranging trim up and/or down resistors 15.1, 16.1; 15.2, 16.2; . . . ; 15.$n$, 16.$n$ between the trim pins 9.1, 9.2, . . . , 9.$n$ and the respective positive and/or negative sense lines 13.1, 14.1; 13.2, 14.2; . . . ; 13.$n$, 14.$n$.

Figure 3A:
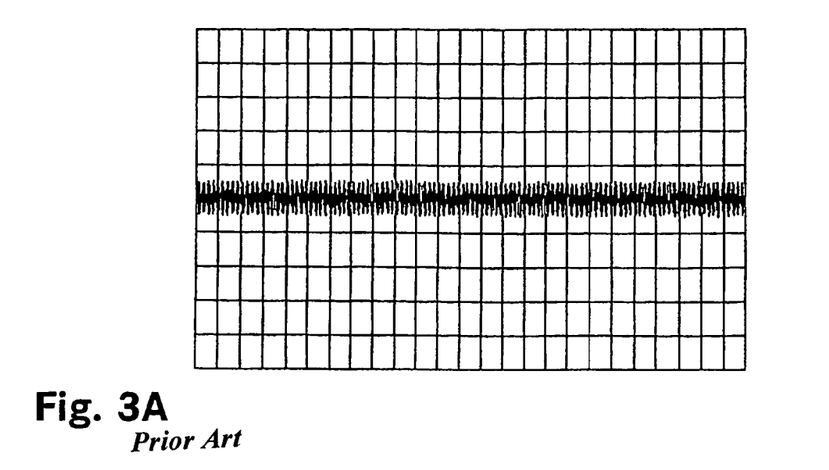
FIG. 3A-C schematic representations of interference effects with DC-DC conversion using prior art switching converters.
Figure 3B:
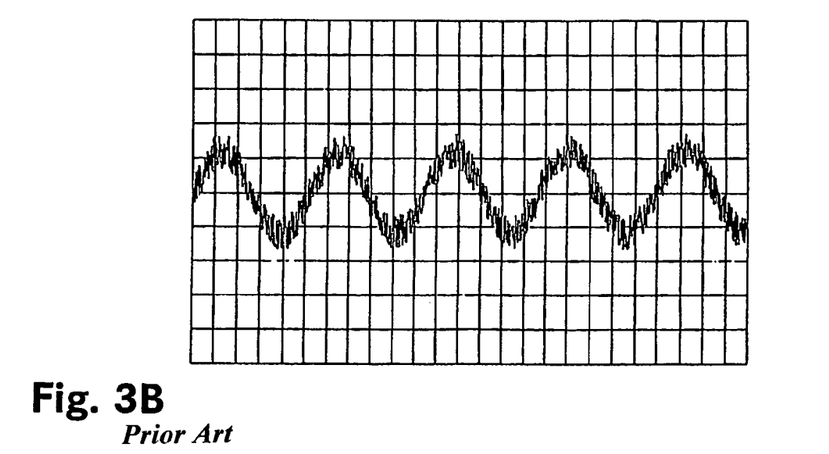
Figure 3C:
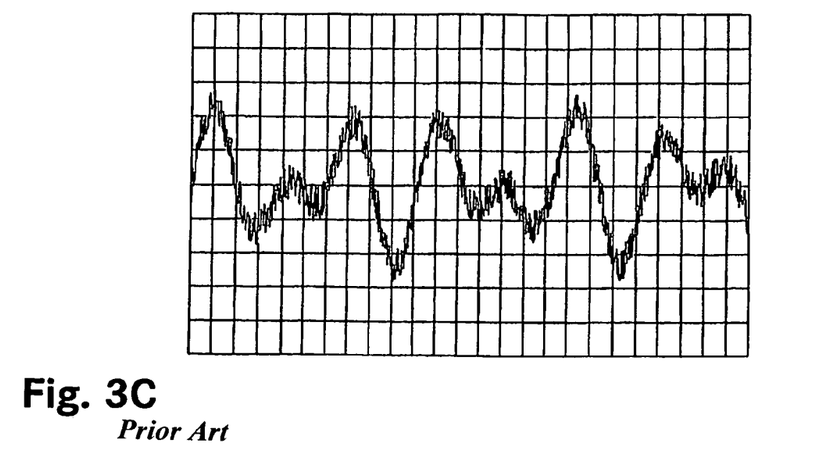

The FIGS. 3A-C are schematic representations of interference effects with DC-DC conversion using prior art switching converters. The FIG. 3A shows input current ripple generated by a single DC-DC converter. The fixed high frequency of this kind of interference corresponds to the switching frequency. The current ripple is injected into the input system EMI filter where it has to be rejected as completely as possible.

The FIG. 3B shows a waveform which is typical for frequency beating phenomena between different DC-DC converters sharing the same input bus. The signal, having e.g. a frequency of about 25 kHz is substantially the difference between the different free running frequencies of the converters. Its amplitude is substantially larger than that of the high frequency current ripple.

In the FIG. 3C an additional interference of the frequency beating signal is additionally represented, namely a parasitic low frequency interference, the DC-DC converters introduce into each other. Including the beating of the ripple effects and this kind of interference the peak to peak amplitude of the total interference is about five times higher than just the input current ripple generated by a single converter. Therefore, a highly sophisticated system input EMI filter is required in order to effectively filter out the interference in the case of a plurality of parallel prior art DC-DC converters sharing a common input bus.

Figure 4:
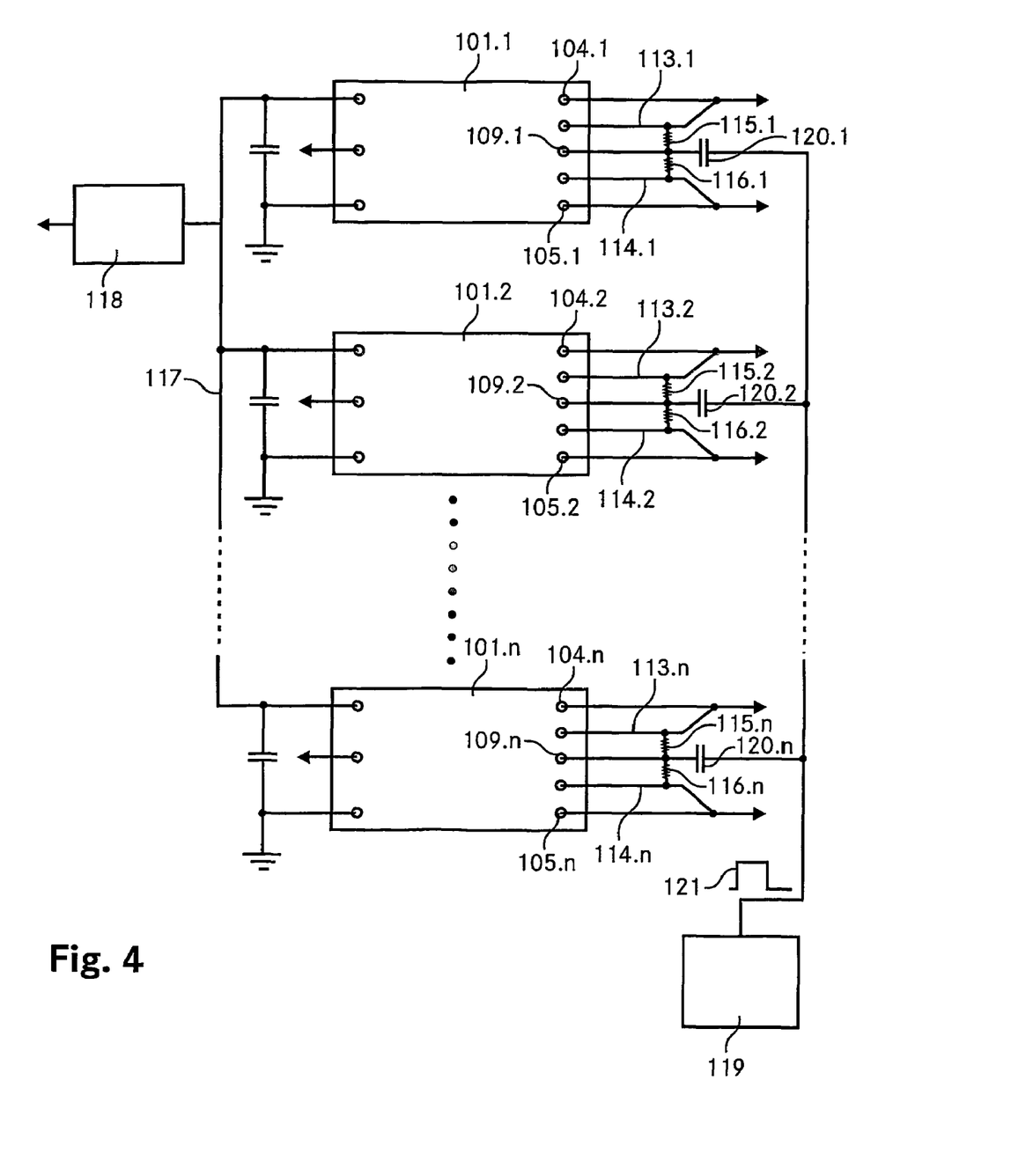
FIG. 4 a schematic representation of a DC-DC converting circuit according to the invention.

The FIG. 4 is a schematic representation of a DC-DC converting circuit according to the invention. It comprises a plurality of the inventive DC-DC converters 101.1, 101.2, . . . , 101.$n$ sharing a common input bus 117 and a common system EMI filter 118. Again, various loads may be connected to the converters 101.1, 101.2, . . . , 101.$n$ between the respective output pins 104.1, 105.1; 104.2, 105.2; . . . ; 104.$n$, 105.$n$, and each of the converters 101.1, 101.2, . . . , 101.$n$ may be individually trimmed by arranging trim up/down resistors 115.1, 116.1; 115.2, 116.2; . . . ; 115.$n$, 116.$n$ between the trim pins 109.1, 109.2, . . . , 109.$n$ and the respective positive and/or negative sense lines 113.1, 114.1; 113.2, 114.2; . . . ; 113.$n$, 114.$n$.

The switching frequencies of the converters 101.1, 101.2, . . . , 101.$n$ are synchronized by an external oscillator 119 connected to the trim pins 109.1, 109.2, . . . , 109.$n$ of the converters 101.1, 101.2, . . . , 101.$n$ via coupling capacitors 120.1, 120.2, . . . , 120.$n$. The external oscillator 119 generates a synchronization signal 121 having a frequency that is higher than each converter's free running frequency and that is on a 5 Vp-p amplitude TTL level. The signal 121 is delivered in phase to all the converters 101.1, 101.2, . . . , 101.$n$ where it is internally processed to lock up the internal pulse-width modulation circuit such that the free running frequency is changed to the external synchronization signal frequency. Thereby, the frequency beating phenomena and the higher interferences between the converters 101.1, 101.2, . . . , 101.$n$ are substantially alleviated such that a usual, plain and low-cost EMI filter 118 suffices for filtering out the input interference of the entire DC-DC converter circuit.

Figure 5:
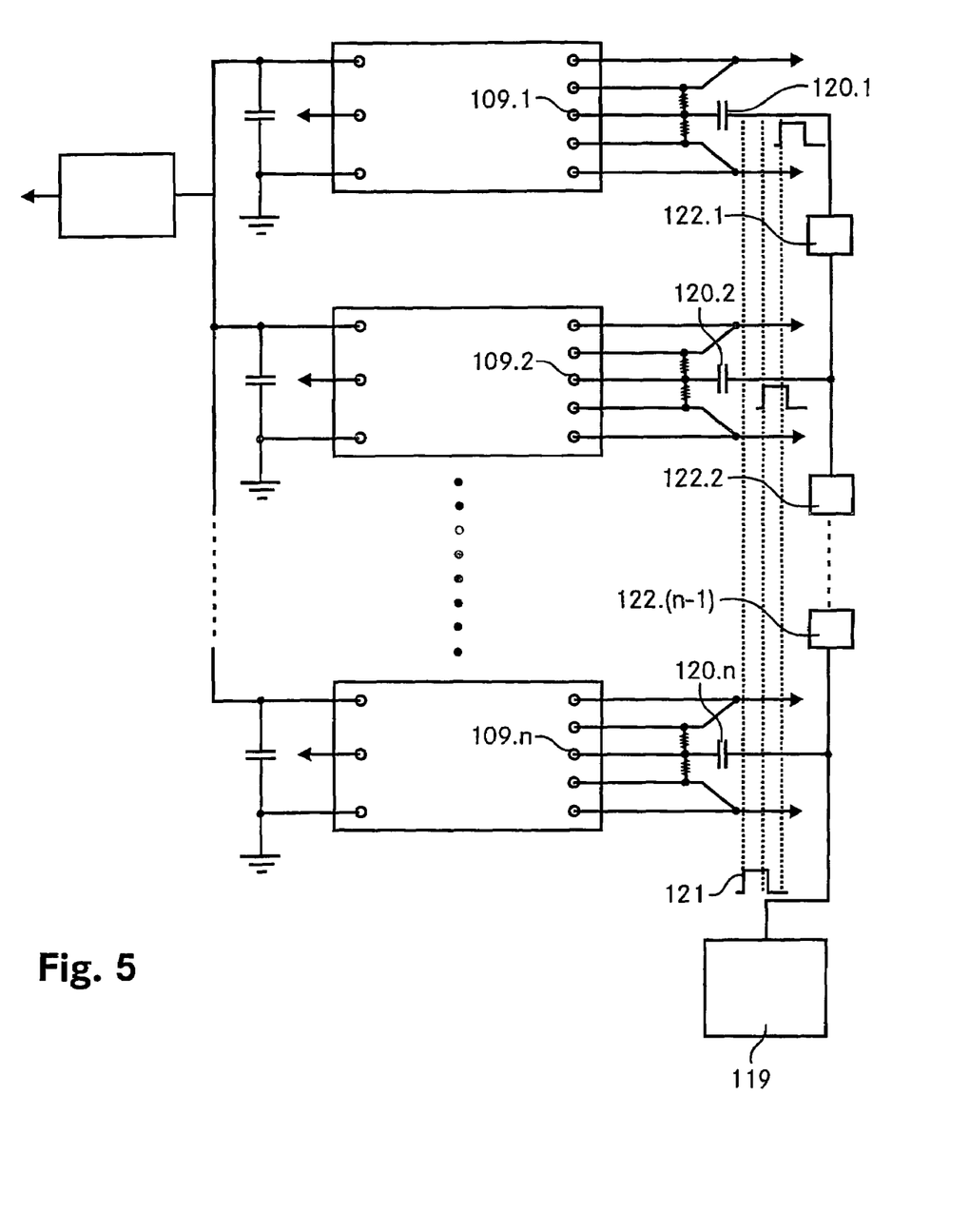
FIG. 5 a schematic representation of another DC-DC converting circuit according to the invention, featuring delaying of the synchronization signal.

The FIG. 5 is a schematic representation of another DC-DC converting circuit according to the invention, featuring delaying of the synchronization signal. The configuration substantially corresponds to that in FIG. 4, however a plurality of fixed delay cells 122.1, 122.2, . . . , 122.($n$−1) are arranged between the external oscillator 119 and the coupling capacitors 120.1, 120.2, . . . by which the synchronization signal 121 is delivered to the trim pins 109.1, 109.2, . . . , 109.$n$. This configuration allows phase interleaving between different DC-DC converters, whereby it is avoided that ripple effects of the frequency synchronized converters 101.1, 101.2, . . . , 101.$n$ become additive. Otherwise, the frequency synchronization of the converters 101.1, 101.2, . . . , 101.$n$ could lead to increased input current ripple due to positive interference between the noise signals generated by the single converters 101.1, 101.2, . . . , 101.$n$ which could partly vitiate the desired effects of the synchronization.

The delay imposed upon the signal 121 by each of the delay cells 122.1, 122.2, . . . , 122.($n$−1) is chosen such that the resulting constant phase differences suppress the occurrence of constructive interference and preferably even lead to destructive interference of the current ripple. The configuration of the delay cells may be chosen as represented in FIG. 5 by serially arranging the cells along the synchronization signal bus, or the external oscillator may be star connected to the trim pins, whereby in each of the connections a single delay cell is arranged, the different cells imposing different delays to the synchronization signal.

Figure 6:
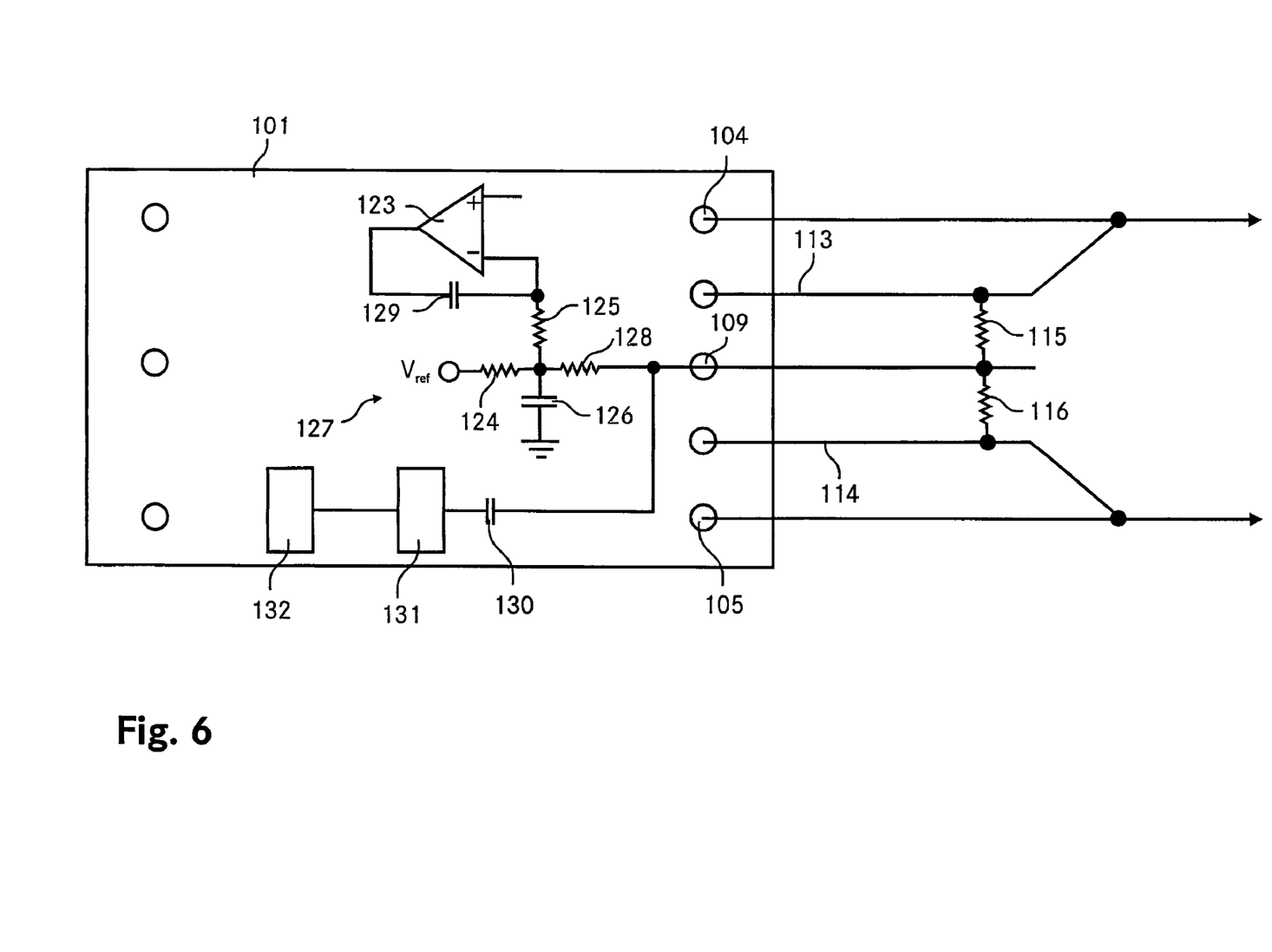
FIG. 6 a schematic representation of a DC-DC converter device according to the invention.

The FIG. 6 is a schematic representation of a DC-DC converter device according to the invention; of the internal circuits only a few components relevant to the invention are represented. For trim functionality, the trim pin 109 of the DC-DC converter 101 is internally connected to an error amplifier 123 of the converter's voltage compensation loop. The error amplifier 123 serves for comparing a desired voltage to the actual output voltage between the output pins 104, 105 or the sense lines 113, 114 respectively. An internal voltage reference $V_{ref}$ is provided for the purpose of voltage compensation. Without external trim up/down resistors 115, 116, the DC voltage applied on the minus pin of the error amplifier 123 is 1.24 V with ±1% accuracy, whereby the source of the voltage reference $V_{ref}$ is connected to the minus pin through serially arranged internal resistors 124, 125. A by-pass capacitor 126 is connected between the two internal resistors 124, 125 and diverts high-frequency noise to ground potential, in order to suppress noise on the minus pin of the error amplifier 123.

The DC output voltage of the converter 101 may be adjusted by the user through utilizing external trim up and/or down resistors 115, 116 as described above. The middle point between the internal resistors 124, 125 and thus accordingly the potential on the minus pin of the error amplifier 123 is tuned by externally adjusting the trim DC voltage by providing corresponding trim resistors 115, 116 (which may be potentiometers for easier adjustment).

To avoid the internal compensation loop being disturbed by the synchronization signal which is also applied on the trim pin 109, a low pass filter 127 is provided. The first cell of the low pass filter 127 is constituted by the by-pass capacitor 126 and a further internal resistor 128, connected between the trim pin 109 and the connection between the other two internal resistors 124, 125. The second cell is built up by the internal resistor 125 connected to the minus pin of the error amplifier 123, by a further capacitor 129 connected between the minus pin and the output of the error amplifier 123 and by the error amplifier 123 itself. Altogether, the low-pass filter 127 has a cut-off frequency of about 6 kHz, and it provides an attenuation of about −40 dB/decade. As a result, the common mode signal present at the differential input of the error amplifier 123 is reduced below 50 mVp-p. Furthermore, the low pass filter 127 helps for rejecting noise delivered to and from the trim pin 109.

For providing the synchronization functionality, a buffer and level shift circuit 131 is connected to the trim pin 109 via a coupling capacitor 130. The buffer and level shift circuit 131 processes the external synchronization signal and delivers the processed signal to the converter's pulse-width modulation (PWM) circuit 132. The coupling capacitor 130 rejects low frequency components of the combined trim/synchronization signal, i.e. primarily the DC trim voltage. Thereby the buffer and level shift circuit 131 is not disturbed by the trim component of the combined signal.

Figure 7:
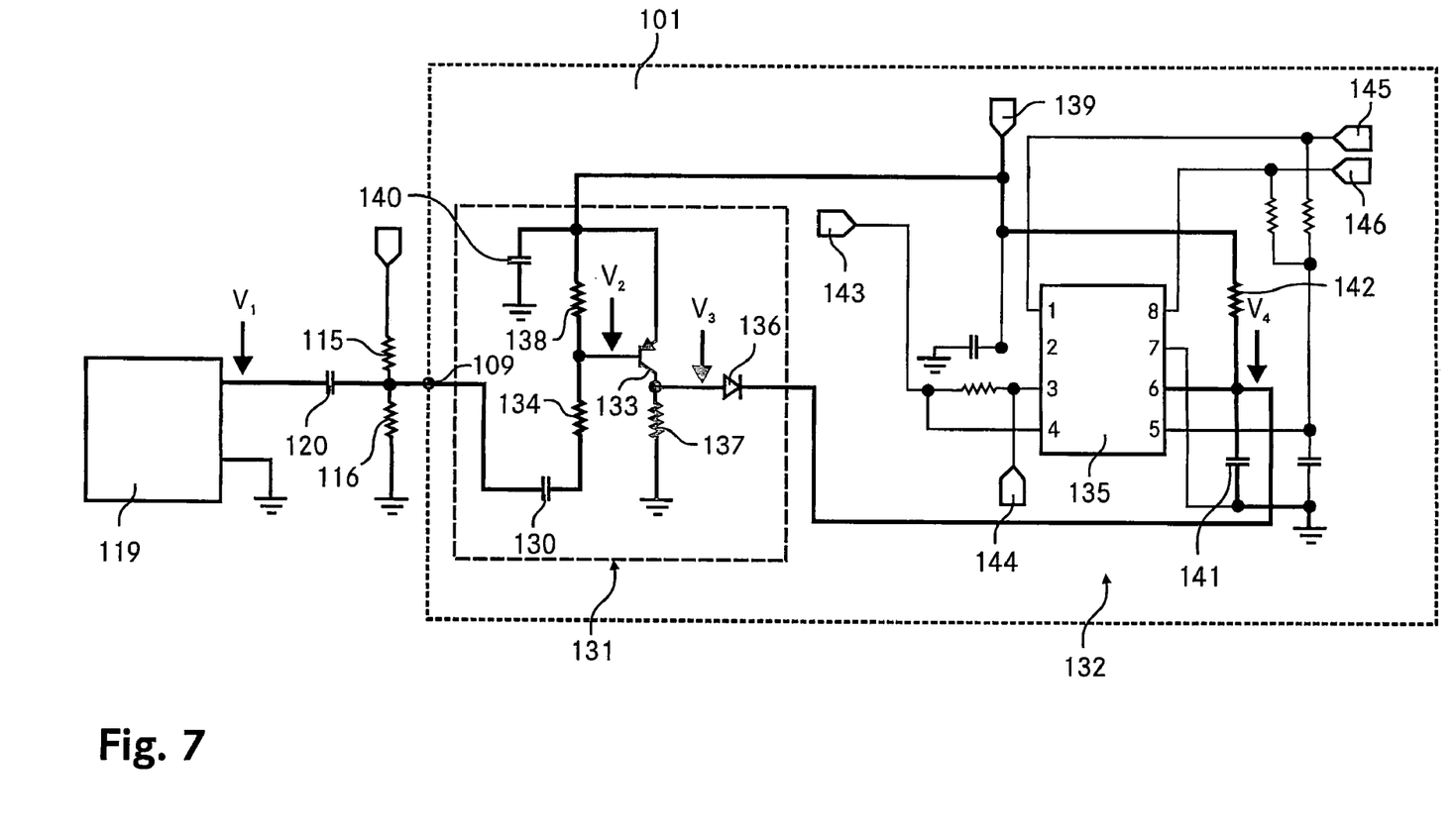
FIG. 7 a schematic representation of the buffer and level shift circuit of the inventive DC-DC converter device as well as of its connection to the internal oscillator unit.

The FIG. 7 is a schematic representation of the buffer and level shift circuit of the inventive DC-DC converter device as well as of its connection to the internal oscillator unit. The buffer and level shift circuit 131 is arranged internally of the DC-DC converter 101 and connected to the trim pin 109 via the entrance coupling capacitor 130. The base of a pnp transistor 133 is connected to the input of the buffer and level shift circuit 131 via a resistor 134. The collector of the transistor 133 is connected with the RC pin (No. 6) of an oscillator unit 135 via a high-speed switching diode 136. In the example represented in FIG. 7, the oscillator unit 135 is a low power current mode push-pull PWM of the type UCC 2808A-2PW (available from Texas Instruments/Unitrode Products) having the following pin assignment:

| pin | name | function |
| --- | --- | --- |
| 1 | OUTA | output #1 |
| 2 | VDD | power input |
| 3 | COMP | output of error amplifier/input of PWM comparator |
| 4 | FB | inverting input to error amplifier |
| 5 | CS | input to PWM, peak current and overcurrent comparators |
| 6 | RC | oscillator programming pin |
| 7 | GND | ground |
| 8 | OUTB | output #2 |

The buffer and level shift circuit 131 further features a resistor 137 connected between the collector of transistor 133 and ground, as well as a resistor 138 connected between the base and the emitter of transistor 133. Power is supplied from a power input 139 to the emitter of the transistor 133, whereby a grounded by-pass capacitor 140 is as well connected to the emitter for suppressing high-frequency noise.

Another grounded by-pass capacitor 141 is connected to the RC pin of the oscillator unit 135. A resistor 142 is connected between the RC pin and the power input 139. In the represented example the above mentioned resistors and capacitors may have the following parameters:

| resistors | resistance | capacitors | capacity |
| --- | --- | --- | --- |
| 134 | 1.21 kΩ | 130 | 56 nF |
| 137 | 10 kΩ | 140 | 330 nF |
| 138 | 1.21 kΩ | 141 | 100 pF |
| 142 | 20 kΩ | | |

The further circuitry represented in FIG. 7 further connects the oscillator unit 135 to the power input 139, the voltage loop 143, the comparator 144 and to output circuits 145, 146. The corresponding configuration is predetermined by the type of oscillator unit used.

Figure 8A:
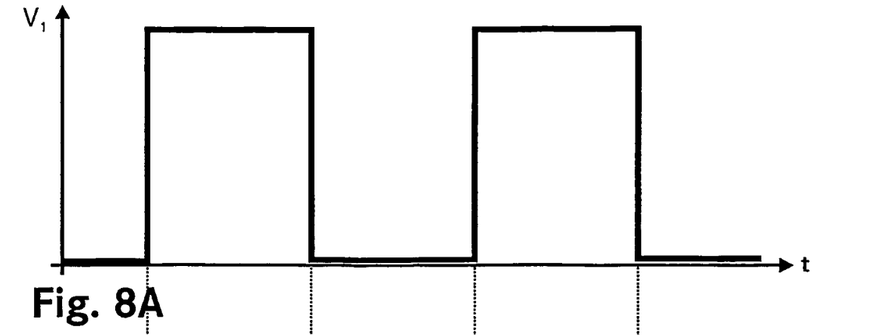
FIG. 8A-D schematic representations of the waveform of the initial and processed synchronization signal at different stages of the processing.

The FIGS. 8A-D are schematic representations of the waveform of the initial and processed synchronization signal at different stages of the processing. The places where the represented voltages $V_1 \ldots V_4$ appear in the circuit are marked in FIG. 7. The FIG. 8A represents the initial rectangular synchronization signal having a duty cycle of 50% and an amplitude of 5 Vp-p TTL as it is delivered by the external oscillator 119.

Figure 8B:
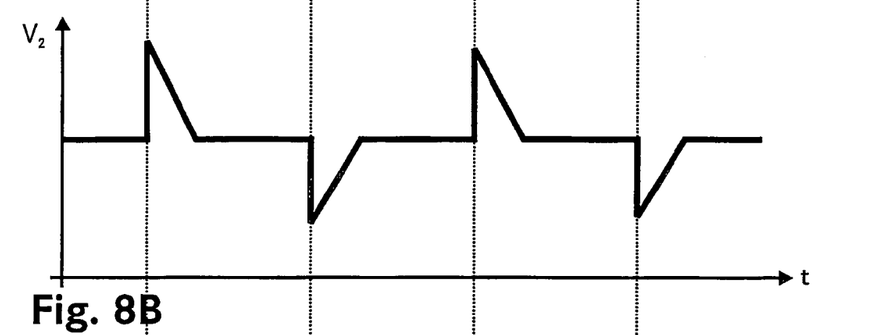
Figure 8C:
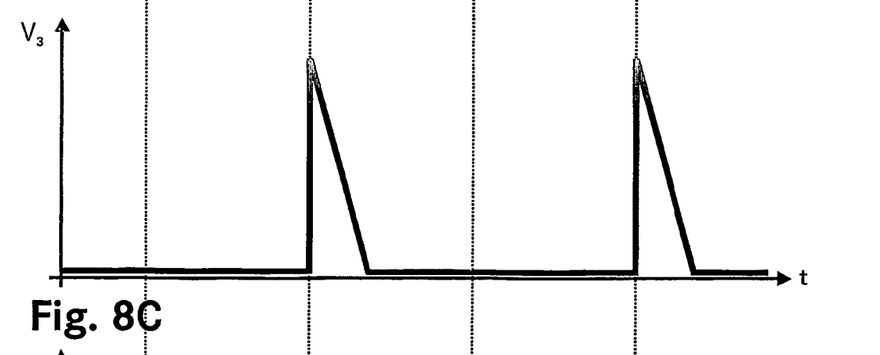
Figure 8D:
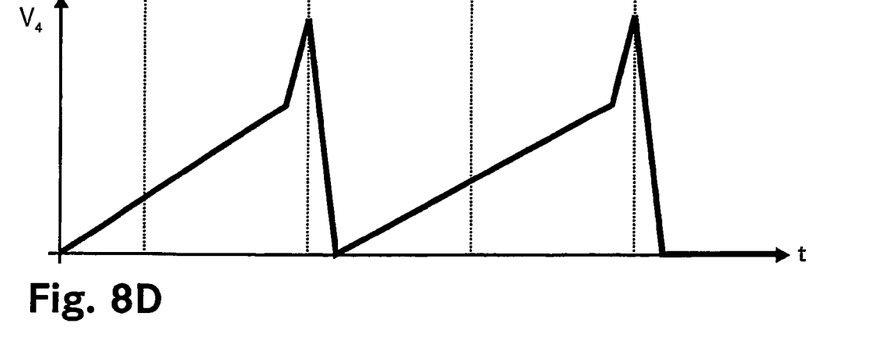

The FIG. 8B represents the differentiated double polarity AC signal produced by the entrance coupling capacitor 130 of the buffer and level shift circuit 131. This signal is used for controlling the transistor 133 where the positive component is chopped off and where the negative component is inverted and amplified to yield the signal represented in FIG. 8C, having an amplitude of again 5 V. The signal finally delivered to the RC pin of the oscillator unit 135 is depicted in FIG. 8D. It is linearly rising until it reaches a potential of about 4 V, another linear rise follows, having a steeper slope until the amplitude of 5 V is reached. Subsequently, the signal decays linearly and rapidly until the 0 V potential is reached whereupon the first linear rise starts anew. The frequency of the peaks equals the frequency of the initial rectangular signal.

The invention is applicable to DC-DC switching converters that are not in a quarter or eighth-brick package but that nevertheless feature a trim pin and do not allow for an extra synchronization pin. The details of the implementation of the invention, especially concerning the low-pass filter arranged in front of the compensation loop and the buffer and level shift circuit, may be different from the described example. In particular, they may depend from the overall design and from the components used for the DC-DC converter circuitry.

In summary, it is to be noted that the invention creates a DC-DC switching converter device, that allows for the reduction of noise in the case of a plurality of DC-DC converters arranged in parallel and sharing a common input bus and EMI filter, the device being cost-efficient and easy to implement into usual converter circuits. The invention further creates a DC-DC converting circuit comprising a plurality of DC-DC converters where the generation of noise is highly suppressed.

Whereas particular preferred exemplary embodiments of the invention have been described, these should not be construed as limiting, since modifications, additions and revisions may be made, as will be apparent to one of ordinary skill in the art without departure from the spirit and scope of the invention as set forth in the appended claims.

The invention claimed is:

1. A DC-DC converter of the kind including a pulse width modulation circuit, and a trim connector for application of a DC trim voltage regulating the output voltage of the DC-DC converter, the improvement comprising:
   (a) a circuit connecting the trim connector with the pulse width modulation circuit and defining a first circuit path delivering to the pulse width modulation circuit an oscillatory synchronization signal derived from an externally generated oscillatory signal applied to the trim connector;
   (b) a further circuit connecting the trim connector with a voltage compensation loop of the DC-DC converter and defining a second circuit path delivering to the voltage compensation loop a DC voltage for adjustment of the output voltage of the DC-DC converter and derived from a DC trim voltage applied to the trim connector; and
   (c) said second circuit path including a low pass filter preventing passage thereon of the externally generated oscillatory signal.

2. The DC-DC switching converter device according to claim 1, wherein the low pass filter filters out signals at a frequency of the external synchronization signal.

3. The DC-DC converter device according to claim 1, wherein the device is a quarter-brick or eighth brick device having industry standard pin out.

4. In a DC-DC switching converter device of the type comprising
   a) a pulse-width modulation circuit for driving a power converting switch, and
   b) a trim connector for adjusting an output voltage of the device; the improvement comprising
   c) the pulse-width modulation circuit being synchronizable to an external oscillator by an external synchronization signal applied to the trim connector, and
   d) a buffer and level shift circuit connected between the trim connector and the pulse-width modulation circuit for processing the external synchronization signal that is a substantially rectangular external synchronization signal on a substantially 5V peak to peak amplitude.

5. The DC-DC switching converter according to claim 4, wherein the pulse-width modulation circuit includes an oscillator having an R/C (remote control) pin and the buffer and level shift circuit having an output signal operatively connected in controlling relation to the oscillator of the pulse-width modulation circuit delivered to the R/C pin thereof.

6. The DC-DC switching converter device according to claim 4 characterized by a coupling capacitor connected between the trim connector and the buffer and level shift circuit.

7. The DC-DC switching converter device according to claim 5 characterized by a coupling capacitor connected between the trim connector and the buffer and level shift circuit.

8. A DC-DC converting circuit comprising
   a) a plurality of DC-DC switching converters having pulse width modulation circuits and trim connectors for adjusting output voltages of the converters, the converters being connected to share a common input bus;
   b) a system EMI (electromagnetic interference) filter common to all the DC-DC switching converters;
   c) an external oscillator delivering an external synchronization signal to the plurality of DC-DC switching converters;
   d) a frequency of the external synchronization signal being higher than a free running frequency of each of the plurality of DC-DC switching converters;
   e) the external oscillator being connected to the trim connectors of the DC-DC switching converters;
   f) each of said DC-DC switching converters having
      i) a buffer and level shift circuit connected between the trim connector and the pulse-width modulation circuit for processing an external synchronization signal applied to the trim connector to synchronize the pulse-width modulation circuit to an external oscillator that is generating the external synchronization signal; and
      ii) a low pass filter connected between the trim connector and a voltage compensation loop of the device to avoid disturbances of the voltage compensation loop by the external synchronization signal.

9. The DC-DC converting circuit according to claim 8, wherein the external synchronization signal of the external oscillator is rectangular, and on a substantial 5V peak to peak amplitude.

10. The DC-DC converting circuit according to claim 8 or 9, further including coupling capacitors connected between the external oscillator and the trim connectors of the DC-DC switching converters.

11. The DC-DC converting circuit according to one of claim 10, wherein at least one fixed delay cell is connected between the external oscillator and one of the plurality of DC-DC switching converters for allowing phase interleaving between different DC-DC switching converters.

12. The DC-DC converting circuit according to one of claims 8 or 9, wherein at least one fixed delay cell is connected between the external oscillator and one of the plurality of DC-DC switching converters for allowing phase interleaving between different DC-DC switching converters.

13. The DC-DC converter according to claim 8, wherein the pulse-width modulation circuit includes an oscillator having an R/C (remote control) pin, and the buffer and level shift circuit having an output signal operatively connected in controlling relation to the oscillator of the pulse-width modulation circuit and delivered to the R/C pin thereof.

14. The DC-DC converting circuit according to claim 8, wherein each DC-DC switching converter is a quarter-brick or eighth brick device having industry standard pin out.

15. A method of converting a first DC voltage into a second DC voltage comprising the steps of
   a) providing a plurality of DC-DC switching converters having trim connectors for adjusting output voltages of the converters and pulse-width modulation circuits for driving a power converting switch;
   b) connecting the converters to a common input bus;
   c) connecting a system EMI (electromagnetic interference) filter to the input bus;
   d) providing an external synchronization signal having a frequency that is higher than a free running frequency of each of the plurality of DC-DC switching converters;
   e) applying the external synchronization signal to the trim connectors of the DC-DC switching converters; and
   f) connecting a buffer and level shift circuit between the trim connector and the pulse-width modulation circuit for processing the external synchronization signal applied to the trim connector to synchronize the pulse-width modulation circuit to an external oscillator that is generating the external synchronization signal.

16. The method according to claim 15, further comprising the step of delaying the external synchronization signal applied to one or more of the plurality of DC-DC switching converters.

17. The method according to claim 15, wherein each buffer and level shift circuit connected between the trim connector and the pulse-width modulation circuit processes an external synchronization signal that is substantially a rectangular external synchronization signal on a substantially 5 Vp-p amplitude.

18. The method according to claim 17, wherein the pulse-width modulation circuit includes an oscillator having an R/C (remote control) pin, and the buffer and level shift circuit having an output signal operatively connected in controlling relation to the oscillator of the pulse-width modulation circuit and delivered to the R/C pin thereof.

* * * * *